United States Patent Office 3,609,893
Patented Oct. 5, 1971

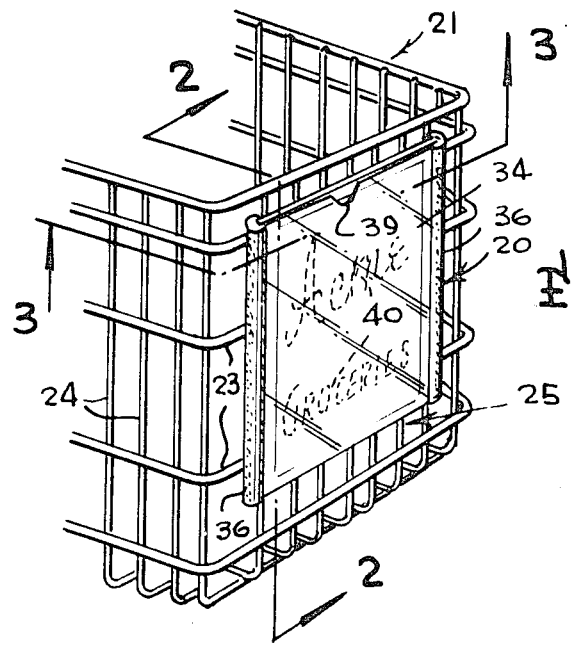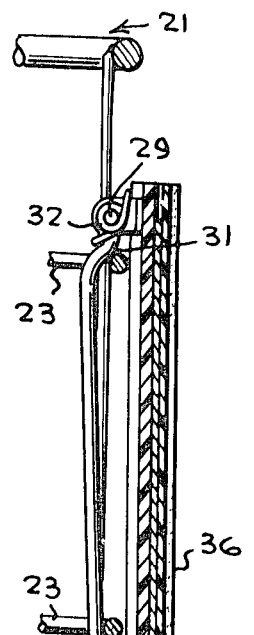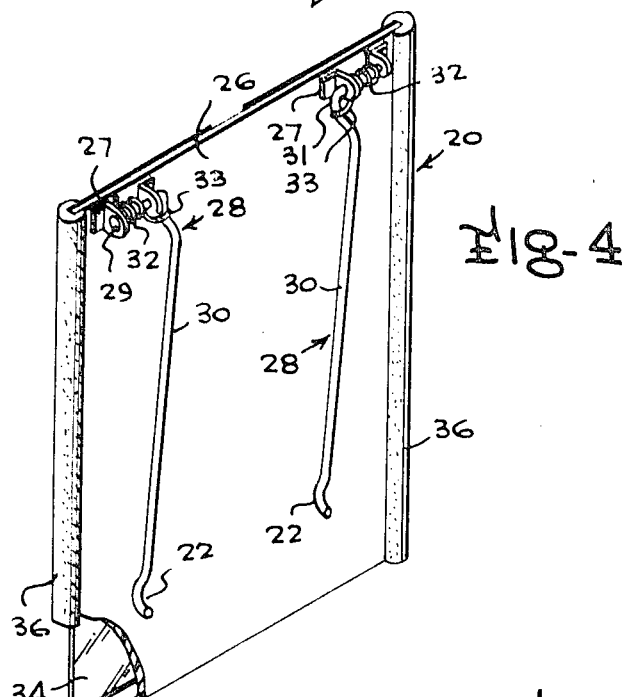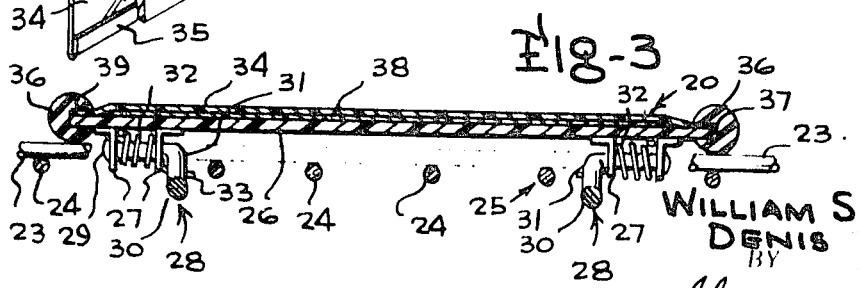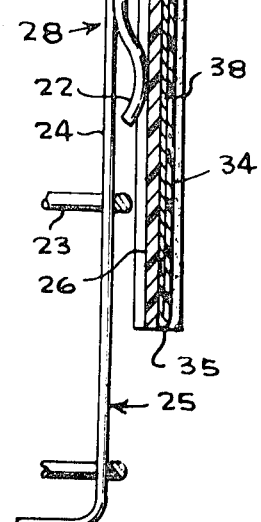

3,609,893
ADVERTISING AND DISPLAY HOLDER
William S. Routzahn, 614 Marshall Road, Glen Burnie, Md. 21061, and Denis S. Moeser, 1301 Centerville Ave., Belleville, Ill. 62231
Filed Aug. 13, 1969, Ser. No. 849,662
Int. Cl. G09f 3/18
U.S. Cl. 40—10 R                     1 Claim

ABSTRACT OF THE DISCLOSURE

An advertising holder for mounting on shopping carts wherein advertisements, printed matter and the like can be conveniently displayed and mounted on shopping carts, and wherein there is provided a means for mounting the device on a shopping cart so that the printed matter can be readily observed or viewed. In addition, there is provided resilient bumpers for the device.

---

This invention relates to shopping carts, and more particularly to a holder for advertisements and the like for mounting on such a shopping cart.

Advertising holders for grocery and shopping carts have been made the subject of prior patents such as shown in prior Pats. Nos. 2,845,729, 2,895,243, 3,024,554, 3,088,236 and 3,281,978. The present invention possesses certain important differences or advantages over such prior devices as subsequently set forth herein.

An object of the present invention is to provide a shopping cart holder and display device wherein there is provided a novel and efficient means for mounting the device on the shopping cart so that the device will be maintained in proper position on the shopping cart and, in addition, the present invention includes resilient bumpers which help assure that damage to the carts will be prevented as, for example, when shopping carts bump into each other or engage each other.

Still another object is to provide such a device and holder for shopping carts that is economical to manufacture and efficient in use and which is rugged in structure and fool-proof in operation.

These and other objects will become apparent from a reading of the specification and claim, together with the accompanying drawings, wherein like parts are referred to and indicated by like reference characters, and wherein:

FIG. 1 is a fragmentary perspective view showing the device of the present invention in place on a shopping cart.

FIG. 2 is an enlarged sectional view taken on the line 2—2 of FIG. 3.

FIG. 3 is an enlarged sectional view taken on the line 3—3 of FIG. 1.

FIG. 4 is a back perspective view of the shopping cart advertisement holder per se, with parts broken away and in section.

Referring in detail to the drawings, the numeral 20 indicates the advertising holder of the present invention which is adapted to be mounted on the rear portion 25 of a conventional shopping cart 21. The shopping cart 21 may include the usual vertical and horizontal rods or wires 24 and 23.

As shown in the drawings, the holder 20 of the present invention includes a support piece 26 which is of a generally rigid material, and suitably mounted or connected to the upper portion of the support piece 26 are L-shaped lugs or brackets 27. The numeral 28 indicates each of a pair of rods or keepers or arms that each comprise first portions 29 that are journaled in the pairs of brackets 27. The keepers 28 further include elongated portions 30 which have offset sections 31 therein adjacent the upper ends thereof. Coil springs 32 are circumposed on the portions 29 of the rods or keepers 38, and the springs 32 are interposed between the adjacent brackets 27. Each of the spring members 32 has an end portion 31 which engages the section 31 of the rod so as to urge or bias the keepers into their proper position.

The device 20 further includes a transparent sheet 34 which may be made of a suitable plastic material, and the side edges of the sheet 34 as well as the side edges of the support piece 26 are snugly engaged in slots 37 that are formed in a pair of spaced generally cylindrical bumpers 36. The lower portion of the transparent sheet 34 is adapted to be folded upwardly as indicated by the numeral 35, FIG. 2, whereby there is provided a means for limiting downward movement of an advertising display card or page 38. The card or advertising member 38 may have suitable printed matter or advertisements 40 arranged thereon. The transparent sheet 34 is adapted to have a finger-engaging recess 39 adjacent the upper edge thereof so as to provide finger clearance space for facilitating insertion and removal of the advertising sheet 38 when desired or required.

The rods 30 have offset lower portions 22 for abutting or engaging the rear surface of the support piece 26 so that the device will be held in place in the proper manner.

It is to be noted that the various elements or parts can be made of any suitable material and in different shapes or sizes.

It will therefore be seen that in accordance with the present invention that there has been provided a device for conveniently holding or for mounting advertisements on a shopping cart or grocery cart such as the cart 21. In use with the parts arranged as shown in the drawings, the device 20 is adapted to be conveniently mounted on the rear portion 25 of the shopping cart 21 and the device 20 is held in place by means of the spring loaded arms or rods 28 which grip or engage the horizontal wires or rods 23 of the shopping cart 21. The arms 28 have the portions 29 thereof that are journaled in the lugs or brackets 27, and the coil springs 32 have their end portions 33 arranged in engagement with the offset sections 31 of the arms 28 so that the arms 28 will be urged into engagement with or towards the support piece 26 whereby the device 20 will be held in its proper location on the rear of the shopping cart as shown in FIGS. 1, 2 and 3. The lower portions of the arms 28 are curved or off-set as at 22 so that a firm grip is assured. With the parts arranged as shown in the drawings, an advertising sheet or card 38 is adapted to be conveniently inserted between the transparent sheet 34 and the support piece 26 so that the printed matter or advertisements 40 on the card 38 will be visible through the transparent sheet 34. Thus, a person pushing or using the cart 21 will have the advertising message visible to him or her whereby the device can be used for displaying various types of prices, information as to sales, advertisements or the like.

In addition, the entire device can be readily removed from the cart 21 when the same is not being used, and this can be accomplished by merely disengaging the device from the back portion 25 of the shopping cart. When the device is being used it is in the position of FIGS. 1, 2 and 3 so that the vertically disposed arms 28 engage portions such as the wires 23 to maintain the device in its proper position. The device 20 also includes the vertically disposed bumpers 36 that are made of a suitable material such as rubber, and the bumpers 36 have diametrically disposed slots 37 for snugly receiving the side edges of the sheet 24 as well as gripping the side edges of the support piece 26.

It will be seen that the device has spring loaded hinges to provide a tight fit, and these hinged members or elements 30 extend perpendicular to the main axis of the device. Spring clips may be provided at the lower end of the device for locking or holding the arms 30 in place. The device is constructed so that it will conveniently fit over the frame through the cross members of the cart body. The device is adapted to be clipped to a shopping cart either over the main frame or through the cross members of the main body of the cart, and the device can be used in markets, chain stores or by independent merchants for increasing their medium of advertising to the purchasing public. The device can be made substantially completely of plastic except for the supports and hinges, or the front can be made of transparent plastic and the back can be made of a suitable material such as metal.

The device is adapted to be arranged contiguous to the main body of the cart so that it does not project above the shopping cart and is easily accessible for inserting and removing advertising materials. In addition, the protective bumpers 36 on each side of the device serve to protect the display when stacking carts or telescoping carts for storage. In addition, the device may be made so that the bottom is closed so that advertising matter may be inserted and removed from the top of the unit. Also, the clear plastic envelope can be made in various sizes and can be used for displaying descriptive information or other material for quick reference. Such a unit is especially suitable for the automotive industry whereby the description and price of automobiles can be displayed without using paste or glue for facilitating attachment to window surfaces. Thus, it can be removed by the buyer and kept as a permanent record and can be prefolded if necessary for easy storage.

It will now be clear that there is provided a device which accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

What is claimed is:

1. An advertising and display holder comprising a support piece of rigid material, pairs of spaced apart L-shaped brackets affixed to the upper portion of said support piece, arms having first portions pivotally engaging said brackets, said arms further including elongated second portions having offset sections, and said arms further embodying lower curved sections, coil springs circumposed on said first portions and interposed between said brackets, and said coil springs having the end portions thereof engaging the offset sections of said arms, spaced parallel resilient bumpers having diametrically disposed slots therein, a transparent sheet arranged adjacent said support piece, the side edges of said sheet and the side edges of said support piece being snugly received in the slots of said bumpers, the lower edge portion of said support piece being folded upwardly so that it is in a position contiguous to the bottom portion of the sheet, said sheet and support piece adapted to receive therebetween a member having advertisements thereon, and said advertisements being visible through the transparent sheet, there being a finger-engaging recess in the upper portion of the sheet, and said advertising and display holder being contiguous to the rear portion of a shopping cart.

References Cited

UNITED STATES PATENTS

| | | | |
|---|---|---|---|
| 276,980 | 5/1883 | Penfold | 40—13 X |
| 2,864,189 | 12/1958 | Campbell | 40—308 |
| 2,888,761 | 6/1959 | Miller | 40—308 |
| 3,082,557 | 3/1963 | Huff | 40—308 X |

FOREIGN PATENTS

| | | | |
|---|---|---|---|
| 807,840 | 7/1951 | Germany | 40—13 |

ROBERT W. MICHELL, Primary Examiner

W. J. CONTRERAS, Assistant Examiner

U.S. Cl. X.R.

40—308